United States Patent
Arbesman

(10) Patent No.: US 11,059,267 B2
(45) Date of Patent: Jul. 13, 2021

(54) METAL AND GRAPHITE LAMINATE

(71) Applicant: Gripmetal Limited, Dublin (IE)

(72) Inventor: Ray Arbesman, Toronto (CA)

(73) Assignee: Gripmetal Limited, Dublin (IE)

( * ) Notice: Subject to any disclaimer, the term of this patent is extended or adjusted under 35 U.S.C. 154(b) by 0 days.

(21) Appl. No.: 16/011,596

(22) Filed: Jun. 18, 2018

(65) Prior Publication Data

US 2018/0297326 A1 Oct. 18, 2018

Related U.S. Application Data

(63) Continuation of application No. 14/907,350, filed as application No. PCT/CA2014/000579 on Jul. 21, 2014, now abandoned.

(30) Foreign Application Priority Data

Jul. 26, 2013 (CA) .................. CA 2821897

(51) Int. Cl.
*B32B 3/30* (2006.01)
*B32B 9/00* (2006.01)
(Continued)

(52) U.S. Cl.
CPC ............. *B32B 9/007* (2013.01); *B32B 3/266* (2013.01); *B32B 3/30* (2013.01); *B32B 7/08* (2013.01); *B32B 9/041* (2013.01); *B32B 15/18* (2013.01); *F16D 65/0006* (2013.01); *F16D 65/0971* (2013.01); *F16J 15/122* (2013.01);
(Continued)

(58) Field of Classification Search
CPC ..... Y10T 428/24339; Y10T 428/24289; B32B 9/007
See application file for complete search history.

(56) References Cited

U.S. PATENT DOCUMENTS

| 1,897,088 A | 2/1933 | Victor |
| 1,915,221 A | 6/1933 | Fitzgerald |

(Continued)

FOREIGN PATENT DOCUMENTS

| CA | 2038152 | 9/1992 |
| CA | 1330521 | 7/1994 |

(Continued)

OTHER PUBLICATIONS

Japanese Office Action and English translation for Application No. 2017-171512, dated Sep. 5, 2018, 10 pages.

(Continued)

*Primary Examiner* — William P Watkins, III

(74) *Attorney, Agent, or Firm* — Brooks Kushman P.C.

(57) ABSTRACT

The present invention is a laminate sheet having two laminae. The first lamina is a relatively hard material having first and second surfaces. The first surface has a plurality of raised and generally pointed piercing structures, each structure having a tip. The second lamina is graphite foil material, which is mated to the relatively hard material, such that at least some of the piercing structures pierce the graphite foil material. In one embodiment, the first lamina has no perforations and is uniformly smooth. In another embodiment, the second surface also has a plurality of piercing structures and a third lamina comprising graphite foil is mated to the second surface.

8 Claims, 4 Drawing Sheets

(51) Int. Cl.

| | | |
|---|---|---|
| *F16J 15/12* | (2006.01) | |
| *F16D 65/097* | (2006.01) | |
| *B32B 3/26* | (2006.01) | |
| *B32B 7/08* | (2019.01) | |
| *B32B 9/04* | (2006.01) | |
| *B32B 15/18* | (2006.01) | |
| *F16D 65/00* | (2006.01) | |

(52) U.S. Cl.
CPC ... *B32B 2307/102* (2013.01); *B32B 2307/536* (2013.01); *B32B 2307/54* (2013.01); *B32B 2307/56* (2013.01); *B32B 2475/00* (2013.01); *B32B 2605/00* (2013.01); *F16D 2200/0021* (2013.01); *F16D 2200/0034* (2013.01); *F16D 2200/0052* (2013.01); *Y10T 428/24289* (2015.01); *Y10T 428/24339* (2015.01); *Y10T 428/24529* (2015.01); *Y10T 428/24545* (2015.01)

(56) References Cited

U.S. PATENT DOCUMENTS

| | | | |
|---|---|---|---|
| 2,171,530 A | 9/1939 | Balfe | |
| 2,255,268 A | 9/1941 | Perrine | |
| 2,274,765 A | 3/1942 | Zalkind | |
| 3,092,532 A | 6/1963 | Swick et al. | |
| 3,513,950 A | 5/1970 | Ratcliffe et al. | |
| 3,533,891 A | 10/1970 | Puyear | |
| 3,551,232 A | 12/1970 | Thompson | |
| 3,557,407 A | 1/1971 | Lemelson | |
| 3,605,360 A | 9/1971 | Lindal | |
| 4,023,613 A | 5/1977 | Uebayasi et al. | |
| 4,234,638 A | 11/1980 | Yamazoe et al. | |
| 4,552,252 A | 11/1985 | Stahl | |
| 4,569,424 A | 2/1986 | Taylor, Jr. | |
| 4,640,390 A | 2/1987 | Saumweber et al. | |
| 4,653,242 A | 3/1987 | Ezard | |
| 4,705,278 A | 11/1987 | Locacius et al. | |
| 4,723,783 A | 2/1988 | Belter et al. | |
| 4,776,602 A | 10/1988 | Gallo | |
| 4,781,389 A | 11/1988 | Beyer et al. | |
| 4,815,172 A | 3/1989 | Ward | |
| 4,911,972 A | 3/1990 | Mercuri | |
| 4,939,818 A | 7/1990 | Hahn | |
| 5,031,483 A | 7/1991 | Weaver | |
| 5,067,210 A | 11/1991 | Keyaki | |
| 5,142,743 A | 9/1992 | Hahn | |
| 5,143,184 A | 9/1992 | Snyder et al. | |
| 5,172,920 A | 12/1992 | Schlenk | |
| 5,362,074 A | 11/1994 | Gallo et al. | |
| 5,376,410 A | 12/1994 | Mackelvie | |
| 5,469,604 A | 11/1995 | Calmettes et al. | |
| D374,609 S | 10/1996 | Akeno | |
| D376,533 S | 12/1996 | Akeno | |
| 5,611,122 A | 3/1997 | Torigoe et al. | |
| 5,738,924 A | 4/1998 | Sing | |
| 5,788,247 A | 8/1998 | Tensor | |
| D400,427 S | 11/1998 | Okawa et al. | |
| 5,842,546 A | 12/1998 | Biswas | |
| 5,879,489 A | 3/1999 | Burns et al. | |
| 5,896,629 A | 4/1999 | Van Hooreweder | |
| 5,975,252 A | 11/1999 | Suzuki et al. | |
| D425,405 S | 5/2000 | Naohara et al. | |
| 6,170,620 B1 | 1/2001 | Akita et al. | |
| 6,247,704 B1 | 6/2001 | Battistoni | |
| 6,258,457 B1 | 7/2001 | Ottinger et al. | |
| 6,276,045 B1 | 8/2001 | Buchi et al. | |
| 6,279,222 B1 | 8/2001 | Bunker et al. | |
| 6,383,678 B1 | 5/2002 | Kaneko et al. | |
| 6,431,331 B1 | 8/2002 | Arbesman | |
| 6,464,047 B1 | 10/2002 | Arbesman | |
| 6,622,346 B2 | 9/2003 | Graham et al. | |
| 6,671,935 B2 | 1/2004 | Filion et al. | |
| 6,843,095 B2 | 1/2005 | Arbesman | |
| 6,860,368 B2 | 3/2005 | Kulis, Jr. et al. | |
| 6,910,255 B2 | 6/2005 | Arbesman | |
| 6,913,673 B2 | 7/2005 | Baggot et al. | |
| 7,048,097 B2 | 5/2006 | Arbesman | |
| 7,222,701 B2 | 5/2007 | Pham | |
| 7,320,386 B2 | 1/2008 | Kulis, Jr. et al. | |
| 7,686,142 B2 | 3/2010 | Jung | |
| 7,841,052 B2 | 11/2010 | Ducauchuis | |
| 7,989,049 B2 | 8/2011 | Potier | |
| 8,048,507 B2 | 11/2011 | Townsend et al. | |
| 8,088,316 B2 | 1/2012 | Muth et al. | |
| D654,355 S | 2/2012 | Cheng | |
| 8,407,864 B2 | 4/2013 | Mask et al. | |
| 8,683,840 B2 | 4/2014 | Tuma et al. | |
| 8,685,520 B2 | 4/2014 | Meyer et al. | |
| 9,273,741 B1 | 3/2016 | Arbesman et al. | |
| 9,360,067 B1 | 6/2016 | Arbesman et al. | |
| 9,388,872 B1 | 7/2016 | Arbesman et al. | |
| 2002/0169435 A1 | 11/2002 | Neeb et al. | |
| 2002/0170789 A1 | 11/2002 | Poelemans | |
| 2004/0016608 A1 | 1/2004 | Gutowski | |
| 2004/0140165 A1 | 7/2004 | Pham | |
| 2004/0201182 A1* | 10/2004 | Notter | B32B 15/04 277/627 |
| 2005/0170157 A1 | 8/2005 | Armela et al. | |
| 2006/0027427 A1 | 2/2006 | Anda et al. | |
| 2006/0118238 A1 | 6/2006 | Borazghi | |
| 2006/0243017 A1 | 11/2006 | Jung et al. | |
| 2006/0246256 A1 | 11/2006 | Ausen et al. | |
| 2008/0003401 A1 | 1/2008 | Barnes et al. | |
| 2009/0223753 A1 | 9/2009 | Kappagantu et al. | |
| 2010/0170758 A1 | 7/2010 | Chen | |
| 2010/0207334 A1 | 8/2010 | Virgin et al. | |
| 2011/0036736 A1 | 2/2011 | Knowlton et al. | |
| 2011/0051724 A1 | 3/2011 | Scott et al. | |
| 2011/0079065 A1 | 4/2011 | Cabanski et al. | |
| 2011/0233875 A1 | 9/2011 | Shaver et al. | |
| 2011/0260371 A1 | 10/2011 | Arora et al. | |
| 2012/0003462 A1 | 1/2012 | Wong | |
| 2012/0006959 A1 | 1/2012 | Braun et al. | |
| 2013/0152654 A1 | 6/2013 | Arbesman et al. | |
| 2013/0224512 A1 | 8/2013 | Zurfluh et al. | |
| 2015/0024231 A1 | 1/2015 | Kutsumiza et al. | |
| 2015/0053517 A1 | 2/2015 | Arbesman et al. | |
| 2015/0086750 A1 | 3/2015 | Arbesman et al. | |
| 2015/0099093 A1 | 4/2015 | Arbesman et al. | |
| 2015/0140255 A1 | 5/2015 | Mackelvie | |
| 2015/0239201 A1 | 8/2015 | Walker | |
| 2016/0167341 A1 | 6/2016 | Arbesman et al. | |
| 2016/0176152 A1 | 6/2016 | Mackelvie | |
| 2016/0230792 A1 | 8/2016 | Arbesman et al. | |

FOREIGN PATENT DOCUMENTS

| | | |
|---|---|---|
| CA | 1337622 | 11/1995 |
| CA | 2127339 | 1/1996 |
| CA | 2272115 | 11/1999 |
| CA | 2300401 | 12/1999 |
| CA | 2391183 | 12/2003 |
| CA | 2778455 | 11/2013 |
| CA | 145893 | 12/2013 |
| CA | 2780397 | 12/2013 |
| CA | 2798303 | 6/2014 |
| CA | 2821897 | 1/2015 |
| CN | 102272471 | 12/2011 |
| DE | 19754740 | 3/1999 |
| DE | 102004048464 | 4/2006 |
| DE | 102006015100 | 10/2007 |
| DE | 102006015145 | 10/2007 |
| DE | 102006015148 | 10/2007 |
| EP | 859163 | 8/1998 |
| EP | 934820 | 8/1999 |
| EP | 1090728 | 4/2001 |
| GB | 2125126 | 2/1984 |
| GB | 2359186 | 8/2001 |
| GB | 2507128 | 4/2014 |
| JP | 59174431 | 11/1984 |
| JP | 8021462 | 1/1996 |
| JP | H08200505 A | 8/1996 |

(56) References Cited

FOREIGN PATENT DOCUMENTS

| JP | H11240706 A | 9/1999 |
|---|---|---|
| JP | 2007170461 A | 7/2007 |
| JP | 2000-243408 | 9/2009 |
| JP | 2013-012626 | 1/2013 |
| JP | 2013053687 | 3/2013 |
| JP | 2013089799 | 5/2013 |
| WO | 0000344 | 1/2000 |
| WO | WO02/090792 | 11/2002 |
| WO | 2011051724 | 5/2011 |
| WO | 2013177667 | 12/2013 |
| WO | 2015010183 | 1/2015 |
| WO | 2015157846 | 10/2015 |

OTHER PUBLICATIONS

"Graphite Sheet Gaskets", Environmental Gasket Company Ltd., copyright 2009, 2009, 5 pages.
"SL T-20 Tang Sheet Specifications Datasheet," Dynoteq Kft, 1 page.
"Tanged Stainless Steel Reinforced Graphite Sheet data sheet", Gee Graphite, 1 page.
U.S. Appl. No. 14/907,350, "Non-Final Office Action", dated Feb. 8, 2018, 7 pages.
Alba Gaskets, "Tanged Graphite", Data/Specification Sheet, 1 page.
Cixi Cazseal Packing & Gasket Co, "Graphite Sheet with Tanged Metal CAZ GrafoilTM 440T", Joint Sheets, 1 page.
James Walker & Co., "Supagraf® expanded graphite jointings", Supagraf Tanged T10, 1 page.
JPU111984174431, "Japanese patent application filed Nov. 21, 1984 (unexamined)".
Ningbo Sunwell, "Tanged Metal Reinforced Graphite Gasket", Data Sheets, Ningbo Sunwell Fluid Technologies Co., Ltd., 2010, 1 page.
SPG Gaskets Co., "Specification Sheet: SPG7003", 1 page.
U.S. Appl. No. 14/907,350, "Non-Final Office Action", dated Sep. 10, 2018, 9 pages.
Brazilian Office Action for Application No. 112016001603-3, dated Jan. 22, 2020, 4 pages.

* cited by examiner

METAL AND GRAPHITE LAMINATE

CROSS-REFERENCE TO RELATED APPLICATIONS

This application is a continuation of U.S. patent application Ser. No. 14/907,350, filed Jan. 25, 2016, which is a U.S. National Stage Patent Application of PCT/CA2014/000579, filed Jul. 21, 2014, which claims the benefit of Canadian Patent Application No. 2,821,897, filed Jul. 26, 2013, all of which are hereby incorporated in their entireties by this reference.

FIELD OF THE INVENTION

The present invention relates generally to laminated materials, and more particularly to laminated materials comprising at least one textured metal sheet layer bound to at least one graphite foil layer.

BACKGROUND OF THE INVENTION

There is a growing need for lighter, stiffer, cheaper structural materials, preferably with all three qualities, with which to make better products.

Stainless steel laminated with graphite foil is a widely used material that has properties that make it suitable for many purposes, such as making gaskets. Such gaskets can provide high blowout resistance and so can be used in applications with high sealing stresses. Such material is permanently elastic over a wide temperature range, such as −200° C. to 550° C. It does not age, is not brittle and provides long-term uniformity and resiliency independent of temperature so that is can withstand high compressive stresses. It can also tolerate high pressure, such as up to 500 bar. The steel, or "carrier", layer is typically a 0.10-0.12 mm thick sheet of "tanged" stainless steel. The laminate is then formed by pressing a sheet of graphite foil onto each surface of the metal sheet to create a laminate with a thickness typically of 1 to 4 mm. The use of tanged metal allows the layers to bind mechanically, without the need for any adhesive, as the tangs on each surface of the metal penetrate into the graphite foil pressed on each surface.

Such tanged metal sheeting is formed by a metal foil puncher, which employs needles that perforate the foil, causing tangs to extend from the side of the sheet opposite the side that the needle penetrates. As a result, the sheeting is weakened by the perforations. Also, if the metal sheet is only laminated on one side, the unlaminated metal surface is not smooth because of the perforations. Furthermore, the thickness of the metal layer is limited because it must be thin enough to allow the puncher needles to penetrate it. It would be desirable to provide a material having graphite foil laminated on at least one side that does not suffer from the disadvantages resulting from the use of such tanged metal.

In a disc brake caliper, a hydraulically actuated piston forces, by action and reaction, a pair of opposing brake pads to pinch a rotor attached to a vehicle wheel. Brake pads have a stiff backing plate with friction pads affixed to one side. Shims of a thin material are often used on the side of the plate contacted by the piston. The shim's function is to reduce the frequency of occurrence of a loud and annoying squeal noise from what are otherwise mechanically perfect brakes. At least some of the noise comes from the fact that, to prevent jamming, the plate has some freedom of radial movement within the caliper so that the rotor can be freed, while the piston has little freedom of movement. In braking, the rigid rotor is frictionally engaged by the hard brake pad (which is in turn supported by its hard backing plate). The brake pad can frictionally slide to some degree against the rigid piston and caliper. High frictional forces are generated during this sliding movement which can cause squeal. Like a stick of chalk forced at an angle across a rigid board, friction can lead to very severe vibrational noise. As well, these recurring forces can lead to fretting and chipping of the piston rim. Brake squeal is a very expensive problem for car and brake manufacturers as customers invariably want the noise remedied under warranty even if the brakes are otherwise perfect.

A great many designs of shims using various materials have been tried over the years to fit between the piston and the plate to reduce such friction and resulting squeal. None have been entirely satisfactory. While graphite sheeting has various properties that make it very suitable for noise reduction, it is unsuitable by itself for use as a shim because of its brittleness. Laminates using graphite foil and tanged metal are generally not suitable because such tanged metal is not strong enough to be well suited for use in brake pad shims. It would be desirable to provide a material with graphite on at least one side that is suitable for use as a shim.

SUMMARY OF THE INVENTION

According to a first aspect of the invention, a laminate sheet having as a first lamina a relatively hard material with first and second surfaces is provided. The first surface has piercing structures extending therefrom which may be pointed. Each structure has an apex portion referred to as a tip. The second lamina is a graphite foil material that is mated to the relatively hard material. The mating is effected by some of the piercing structures protruding into the graphite foil material, piercing the inner surface of the graphite foil.

The relatively hard material is preferably not perforated and the second surface may be flat. At least some of the piercing structures may extend completely through the graphite foil material, protruding through the outer surface of the graphite foil to expose their tips. At least some of the exposed tips of the piercing structures may be clinched, meaning that they are turned over, onto or into the graphite foil material. In other embodiments, the piercing structures may not extend completely through the graphite foil material so that the outer surface of the foil remains uniformly smooth.

The relatively hard material is preferably metal, which preferably is steel. It may have a thickness of at least 0.2 mm or may have a thickness of at least 5.0 mm, although the thickness may be less than or equal to 0.2 mm.

According to a second aspect of the invention, a multi-layer laminate sheet having a first lamina that is a dual sided sheet of a relatively hard material with texturing on two surfaces thereof is provided. The surface texture is created by a plurality of raised and generally pointed piercing structures, with each structure having an apex portion referred to as a tip. The laminate includes two outer laminae of a graphite foil material, one layer being disposed on each surface of the dual sided sheet. The graphite foil material is mated to the relatively hard material by having some of the piercing structures of the relatively hard material protrude through the inner surface of the foil into the graphite foil material. The relatively hard material is preferably not perforated. At least some of the piercing structures may extend completely through one of the layers of graphite foil material, protruding through the outer surface of the foil, to expose their tips. At least some of the exposed tips of the piercing structures may be clinched by being turned over, onto or into the graphite foil material. In other embodiments, the piercing structures may not extend completely through the graphite foil material so that the outer surfaces of the foils remain uniformly smooth.

According to a third aspect of the invention, a noise damping shim is provided. The shim has a first layer of a relatively hard material having first and second surfaces. The first surface has a plurality of raised and generally pointed piercing structures and is mated to a second layer of a graphite foil material such that at least some of the piercing structures pierce the graphite foil material. The shim may be configured to engage a brake pad so that it acts as an intermediate element (or buffer) between the backing plate and piston of the braking system.

BRIEF DESCRIPTION OF THE DRAWINGS

FIG. 7 shows detail of a single piercing structure embedded in a graphite foil lamina, which may be too thick to pierce through.

DETAILED DESCRIPTION OF THE INVENTION

In the following description the word "clinch" (clinching, clinchable, clinched), is used to describe the act of bending over the exposed apex portion or "tip" of a pin- or nail-like structure that has pierced through two or more layers and extends therefrom. Clinching is common practice in the wood construction trade. Clinching is analogous to riveting in metal work, or to any other deformation of a fastener to prevent its easy withdrawal. The purpose of clinching is to impart greater cohesion between the two laminate layers that are so joined.

The terms "pointed structure" and "piercing structure" are used synonymously herein as a general term to describe any type of nail- or pin-like structure (or hooked or barbed structure) raised on the surface of a material (for embedding or piercing) that are capable of piercing and then penetrating the surface of a graphite foil. An appropriate choice of hardness of the material and shape and configuration of the piercing structures is selected to ensure such piercing capability.

In the instant invention, piercing structures have been raised from a surface of a lamina consisting of relatively hard material, such as a sheet of stainless steel. They can pierce into the inner surface of an adjacent graphite foil lamina and, if longer than the graphite foil's thickness, can pierce the outer surface of the foil. The protruding tips may be bent over or clinched to create the "locked-laminate" embodiment of the instant invention. In a laminate, where a first lamina is mated with only one other lamina, the surface, or face, of the first lamina that is mated to the other lamina is referred to as the inner surface, and the other surface, which is not mated with another lamina, is referred to as the outer surface.

Figure 1:
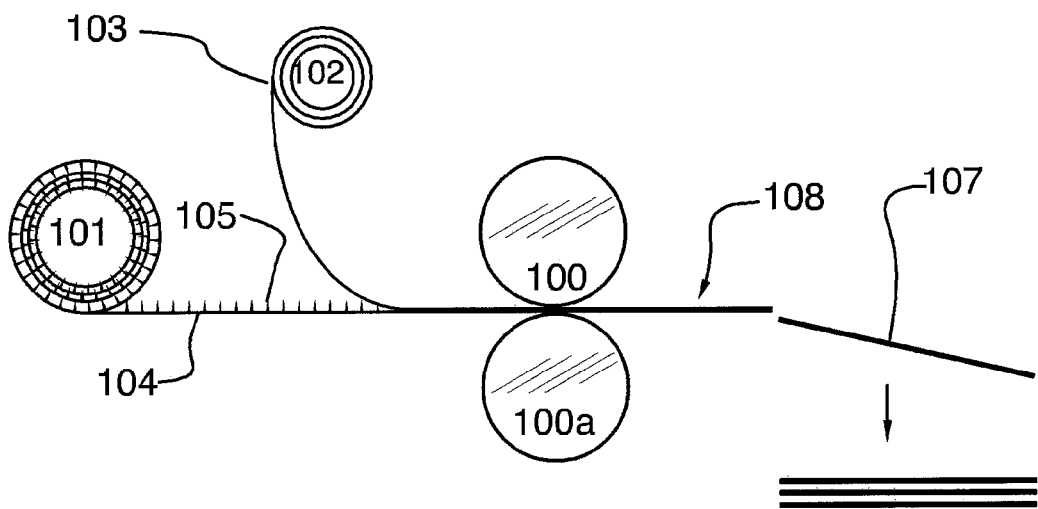
FIG. 1 shows a continuous process of producing a laminate sheet from two supply coils, the lower lamina having piercing structures and the upper lamina being made of a graphite foil material.
Figure 3:
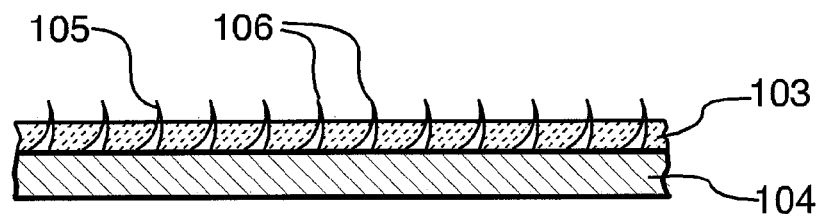
FIG. 3 shows an embodiment where the structures have pierced through the graphite foil material and where the pointed tips are above its surface.

FIG. 1 shows a process for making a continuous laminated metal and graphite material. Coil 101 supplies the first lamina of textured metal 104 having one face textured with piercing structures 105 having pointed tips 106. Coil 102 supplies the second lamina of graphite foil 103. The two lamina layers are fed between pressure rolls 100, 100*a*. Under pressure from rolls 100, 100*a*, the inner surfaces of the two laminae are forced together so that some, or preferably most or all of the piercing structures of the textured metal sheet 104 penetrate through the lower surface of the graphite foil 103. They may not pierce the upper surface of the graphite foil 103, as in FIG. 1. Alternatively, the piercing structures of the textured metal sheet 104 may penetrate through the upper surface of the graphite foil 103, so that their apex portions or "tips" are exposed (as shown in FIG. 3), and then be clinched by a second roll set (not shown) or other means.

The first lamina may be formed from any suitable relatively hard material but is preferably made of a ductile material such as sheet steel. Various materials may be used. In one preferred embodiment, the first material has a Brinell hardness of more than about 80. The side (outer surface) of the first lamina, which is not textured, is preferably flat and uniformly smooth, with no holes or perforations therethrough.

The two laminae are thereby continuously locked together as a laminate 108 which can then be severed into individual sheets 107 of laminate. Alternatively, the laminate 108 may be collected as a bulk product on a take-up reel (not shown) (thus, the process may be a coil-to-coil process). The bulk product may be further cut or shaped for specific applications, including cut-to-measure applications on a job site.

Rolls 100, 100*a* can press against the entire width of the material "sandwich" or just in localized areas (e.g. edges).

Figure 2:
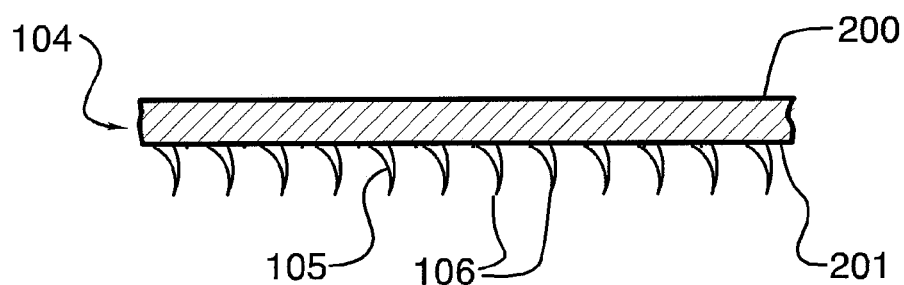
FIG. 2 shows detail of a textured lamina sheet of relatively hard material with piercing structures that have a tapered cross-section ending in a pointed tip, populating the surface.

FIG. 2 shows the textured face 201 and plain face 200 of textured metal sheet 104, which faces may be the same or of different materials such as steel-steel or steel-aluminum. Piercing structures 105 have piercing, pointed tips 106. In FIG. 3, the tips 106 are shown to pierce through the outer surface of the graphite foil 103 and extend thereabove. For example, curved or hook-shaped piercing structures 105 may be inherently formed in the initial process to prepare the textured metal sheet 104 (for example, using the process described in the application "Bulk Textured Material Sheeting", Canadian Patent Application No. 2,778,455, of the same applicants, filed in Canada on May 29, 2012, or the process described for example in any of Canadian Patent Nos. 1,330,521, 1,337,622, or 2,127,339, the disclosures of all of which are incorporated herein by reference). Alternatively, more straight upright (e.g. nail-like) structures may be employed. These may be pre-bent into more hook-shape structures. Such pre-bending can be done using rollers or a press arrangement between flat platens so as to bend the thinner tips over into hooks.

Figure 4:
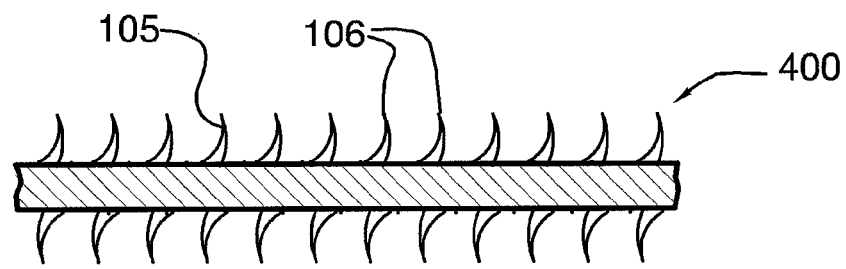
FIG. 4 shows an embodiment of a textured lamina sheet of relatively hard material with both faces textured with piercing structures.
Figure 5:
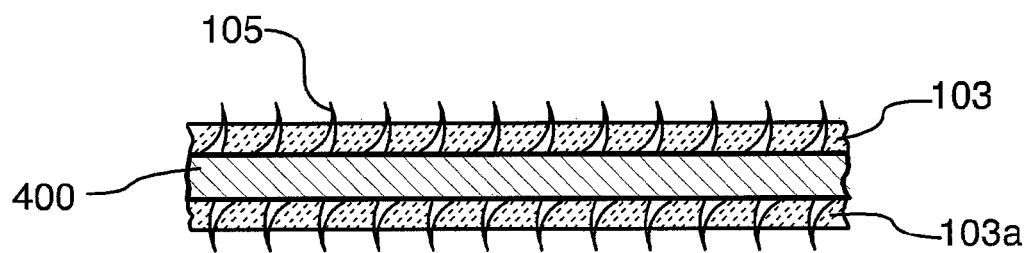
FIG. 5 shows another embodiment of three layer laminate where the central textured lamina sheet of relatively hard material has both faces textured with piercing structures and the outer graphite foil laminae have been pierced by the pointed tips of the piercing structures.

FIG. 4 shows a metal sheet 400 with both faces textured with piercing structures 105 so that that it can form the core between two graphite foil layers 103, 103a. In FIG. 5 the same double textured metal sheet 400 is shown as a first (core) lamina with a graphite foil layer 103, 103a on either side, creating a three layer laminate.

Figure 6:
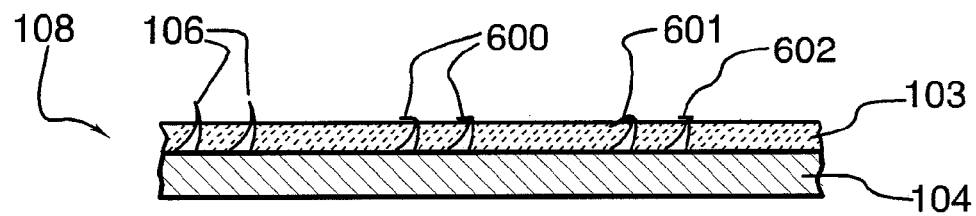
FIG. 6 shows detail of clinching where the tips are sequentially rolled down to the final clinched position on the upper face of the pierceable graphite foil lamina.

FIG. 6 shows a laminate 108 with the tips 106 being clinched, while passing between rollers, to a fully clinched position 600 by being pressed together against a hard third surface such as an anvil. Also shown in FIG. 6 are examples of how the tips 106 may be reverted 601 so as to be pointing pack into the graphite foil, or crushed 602, where the effect is akin to riveting.

Figure 7:
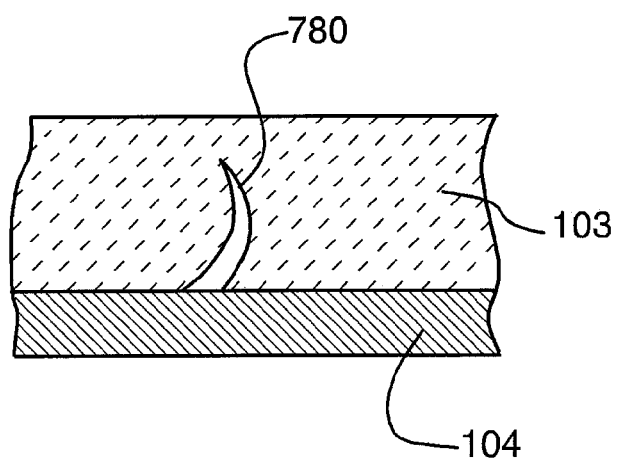

FIG. 7 shows detail of one piercing structure 700 on the textured face 201 of textured metal sheet 104. The piercing structure 700 has a tapered cross-section ending in a pointed tip. The inner surface of the graphite foil 103 is pierced by the piercing structure 700, but the piercing structure 700 does not pierce the outer surface of the graphite foil 103 and so the piercing structure 700 is fully embedded in the graphite foil 103. This of course applies to all piercing structures in such a lamination process.

Figure 8:
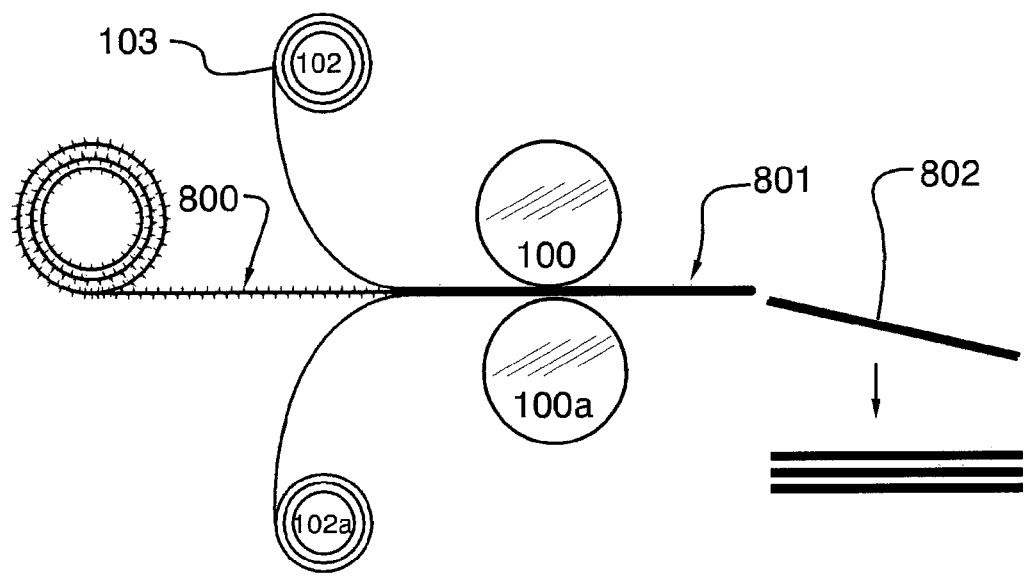
FIG. 8 shows another embodiment where the core material is the harder piercing lamina textured on both faces and the outer lamina are pierceable graphite foil material and are forced onto the harder core.

FIG. 8 shows the rolling lamination process applied to a core of double-textured metal sheet 800 with outer laminae both being graphite foil 103, 103a which are fed from upper and lower coils 102, 102a. The rollers 100, 100a, press the upper sheet of graphite foil 103 against the textured upper surface of the metal sheet 800 so that the piecing structures on the top surface of the metal sheet 800 penetrate through the lower surface of the upper graphite sheet and become embedded in the graphite foil 103 to mate the layers in the laminate 800. Similarly, the rollers 100, 100a, press the lower sheet of graphite foil 103 against the textured lower surface of the metal sheet 800 so that the piecing structures on the lower surface of the metal sheet 800 penetrate through the upper surface of the lower graphite sheet and become embedded in the graphite foil 103 to mate the layers in the laminate 800. The resulting laminate 801 may be severed into individual sheets of laminate 802

Unlike the prior art, the first lamina of relatively hard material may be formed from any desired thickness of material that can be suitably textured. For example, the thickness of the first lamina may be greater than or equal to 0.3 mm, 1.0 mm, 5.0 mm or 10.0 mm, although for some applications the thickness may be less than 0.3 mm, 0.2 mm or 0.1 mm. The texturing may be performed so as to ensure that the vertical (i.e. perpendicular to the surface of the lamina) heights of the piercing structures do not exceed the thickness of the graphite foil lamina(e) to be used, in which case the piercing structures will not penetrate through the outer surface(s) of the foil(s) in the laminate so that the outer surfaces of the laminate are uniformly smooth. Alternatively, the piercing structures may have a vertical height sufficiently greater than (e.g., 1.3 to 1.5 times greater than) the thickness of the graphite foil to be used to form the laminate so that the tips of some, most or all of the piercing structures pierce and protrude through the outer surface of the graphite foil and are exposed. As discussed above, the exposed tips of the piercing structures may then be clinched.

A shim is a noise-reducing inter-layer piece of material of any shape or outline. As discussed above, shims are widely employed between brake pistons and brake pad backing plates to reduce noise, such as squealing, which may occur when the piston engages the backing plate during braking.

Graphite has noise-reducing properties that make it well suited for use as a noise insulator. However, by itself, it is too brittle to be used as a shim. The metal-graphite laminate described herein though is well suited for use as a shim, such as a braking pad shim. The laminate is an effective noise damping medium. With its lubricating properties, graphite modulates the braking effect of friction linings and contributes to braking comfort and to noise reduction. The excellent thermal conductivity properties of graphite also play an important role in the use of the laminate in applications where there are large temperature variations, such as in automotive brakes. Graphite has a much lower friction coefficient than materials typically used to produce shims so that the laminate acts as a slip agent, which contributes to its noise-reducing ability. Graphite is also resistant to oxidation.

Figure 9:
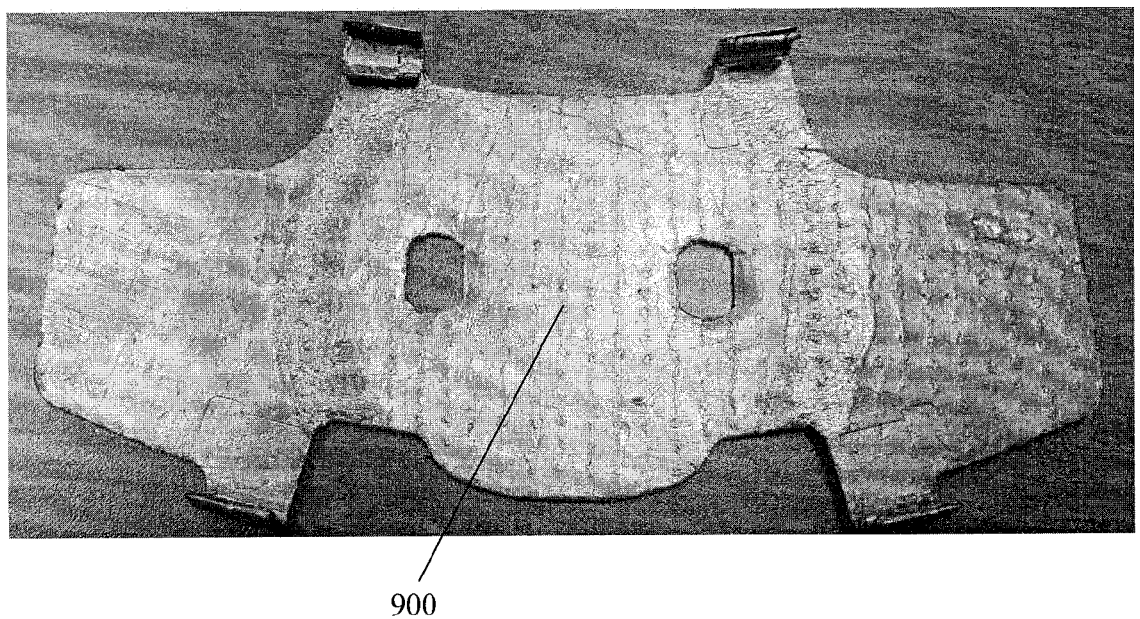
FIG. 9 shows the graphite foil side of a two-layer metal-graphite laminate in the form of a brake bad shim.

In embodiments where the piercing structures protrude through the outer surface, and are optionally clinched, the resulting outer surface of the graphite foil becomes "bubbled", as shown in FIG. 9. FIG. 9 shows the graphite foil side of a two-layer metal-graphite laminate in the form of a brake bad shim. Each exposed tip 900 appears as a bubble on the surface of the foil. As long as the exposed tips are either clinched, or are sized so that only a small amount of the tip is exposed, the resulting bubbled surface remains relatively smooth to the touch.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A method for producing a multi-layer laminate sheet, the method comprising:
   a) supplying a sheet metal core to a lamination station, the sheet metal core having a first face that is textured with a first plurality of raised and generally pointed piercing structures, and an opposed second face that is textured with a second plurality of raised and generally pointed piercing structures, wherein the first plurality of raised and generally pointed piercing structures and the second plurality of raised and generally pointed piercing structures are hook-shaped;

b) supplying a first layer of graphite foil to the lamination station, the first layer of graphite foil having a first layer inner face and an opposed first layer outer face, c) forcing together the sheet metal core and the first layer of graphite foil to pierce the first layer inner face with the first plurality of raised and generally pointed piercing structures;

d) supplying a second layer of graphite foil to the lamination station, the second layer of graphite foil having a second layer inner face and an opposed first layer outer face; and e) forcing together the sheet metal core and the second layer of graphite foil to pierce the second layer inner face with the second plurality of raised and generally pointed piercing structures.

2. The method of claim 1, wherein in step c), the first plurality of raised and generally pointed piercing structures do not protrude through the first layer outer face.

3. The method of claim 1, wherein in step e), the second plurality of raised and generally pointed piercing structures do not protrude through the second layer outer face.

4. The method of claim 1, wherein steps a), b), and d) are carried out simultaneously.

5. The method of claim 1, wherein steps c) and e) are carried out simultaneously.

6. The method of claim 5, wherein steps c) and e) comprise feeding the sheet metal core, the first layer of graphite foil, and the second layer of graphite foil between rollers.

7. The method of claim 1, wherein the sheet metal core is a sheet steel core.

8. The method of claim 1, wherein the sheet metal core does not include perforations associated with the first plurality of raised and generally pointed piercing structures or the second plurality of raised and generally pointed piercing structures.

* * * * *